(12) United States Patent
Garbagnati et al.

(10) Patent No.: US 8,460,141 B2
(45) Date of Patent: Jun. 11, 2013

(54) CHAIN WITH LUBRICANT SEALING GASKETS

(75) Inventors: Carlo Garbagnati, Lecco LC (IT); Massimiliano Fumagalli, Lecco LC (IT)

(73) Assignee: Regina Catene Calibrate S.p.A., Milan (IT)

( * ) Notice: Subject to any disclaimer, the term of this patent is extended or adjusted under 35 U.S.C. 154(b) by 877 days.

(21) Appl. No.: 12/458,937

(22) Filed: Jul. 28, 2009

(65) Prior Publication Data

US 2010/0022341 A1   Jan. 28, 2010

(30) Foreign Application Priority Data

Jul. 28, 2008   (IT) .............................. MI2008A1386

(51) Int. Cl.
*F16G 13/02*   (2006.01)
*F16J 15/32*   (2006.01)

(52) U.S. Cl.
USPC .......................................... 474/207; 277/402

(58) Field of Classification Search
USPC ............... 474/205–229; 184/15.1, 15.2; 59/4, 59/5; 277/345, 399, 402
See application file for complete search history.

(56) References Cited

U.S. PATENT DOCUMENTS

| | | | |
|---|---|---|---|
| 4,094,515 A * | 6/1978 | Araya et al. .................. | 277/402 |
| 5,425,679 A | 6/1995 | Utz | |
| 5,921,880 A | 7/1999 | Ishimoto et al. | |
| 6,782,688 B2 * | 8/2004 | Garbagnati et al. ................ | 59/5 |
| 2002/0072443 A1* | 6/2002 | Kanehira et al. .............. | 474/207 |
| 2004/0058766 A1* | 3/2004 | Schumacher et al. ........ | 474/207 |
| 2007/0155563 A1 | 7/2007 | Aoki | |
| 2008/0061512 A1 | 3/2008 | Yamane et al. | |

FOREIGN PATENT DOCUMENTS

JP   01 238734   9/1989

* cited by examiner

*Primary Examiner* — Michael Mansen
*Assistant Examiner* — Robert T Reese
(74) *Attorney, Agent, or Firm* — Jacobson Holman PLLC

(57) ABSTRACT

A chain has links formed by pairs of internal and external plates respectively connected by pins and inserts fitted onto the pins and projecting through the internal plates. Rollers are fitted onto the inserts between the internal plates and a lubricated interface is identified between each roller and the respective insert. The roller is provided, at each end, with a bevel or cavity tilted inwards the roller to identify a seat between the internal plate and the external surface of the respective insert, into the seat the sealing gasket being accommodated. A further sealing gasket is advantageously arranged between the plates to seal an interface between the pin and insert.

9 Claims, 3 Drawing Sheets

CHAIN WITH LUBRICANT SEALING GASKETS

BACKGROUND OF THE INVENTION

1. Field of the Invention

The present invention refers to an innovative lubricated chain equipped with innovative lubricant sealing gaskets.

2. State of the Prior Art

So called "O-Ring" chains, are widely used in the field of motorcycling, but not only, thanks to their very high durability, obtained by using O-ring gaskets, which allow the grease to be kept between pin and insert, so that the chain has a greater wear resistance than any non O-Ring chain.

Unfortunately, O-Ring chains also have to be lubricated periodically.

The reason for this is to be found in the need of keeping a correct lubrication, not only between pin and insert, but also between insert and roller.

Especially at high speeds, indeed, it may be the case that the lubricant between roller and insert is lost due to the centrifugal force. This fact causes overheating of the contact surface between roller and insert and their wearing. This wearing is the main cause of the breaking of the rollers and the heating spreading to the pin-insert articulation, accelerates the degradation of the grease sealed therein and the subsequent wearing of the pin and insert. If an O-Ring chain is not lubricated periodically, these two phenomena substantially limit its useful life.

In order to avoid this problem, attempts have been made in the past, to seal the grease between insert and roller as well. Chains with rollers, which are externally shaped in proximity to the ends, so as to accommodate sealing rings, made to work between the external surface of the roller and the side plate, have thus been proposed. However, in such chains the sealing rings are exposed and can easily deteriorate whilst the chain is operating. For example, the O-Ring risks coming into contact with the gear wheels on which the chain is engaged. The hydraulic seal is poor, due to the fact that there are only two pivot points of the gasket. Not being protected, the O-Ring needs to be lubricated and thus all the substantial advantage of the solution is lost. Chains having such a structure, if used in the motorcycling field, have a warrantee of less than 1000 Km.

Moreover, in order to maintain the size of the engagement surfaces of the rollers (foreseen by law), it is necessary to increase the thickness of the chain.

Chains with a step seat at each internal end of the roller have also been proposed, for example, in U.S. Pat. No. 5,425,679. The ring gasket is inserted in each rectangular seat thus formed. The gasket is thus protected from the outside. However, the durability of such chains is still unsatisfactory if a periodic lubrication is not carried out. A first cause can be due to the degradation of the seal caused by mechanical actions both resulting from the forces and also from the contact points, which are produced on the O-Ring within the rectangular seat. The chain is also difficult to assemble automatically or semi-automatically, since it is difficult to fill the interfaces with lubricant and then to position the sealing gaskets. This makes the chain excessively expensive.

Also in the industrial field there are a series of applications where it is not possible to carry out a periodic lubrication of the chain and, in the case of O-Ring chains, they start to encounter difficulties due to the rollers, especially in environments which are highly corrosive.

The general purpose of the present invention is to avoid the aforementioned drawbacks by providing a chain which does not require lubricating and that is long lasting.

SUMMARY OF THE INVENTION

In view of such a purpose, it has been thought to make, according to the invention, a chain with links formed by pairs of external and internal plates, respectively connected by means of pins and inserts fitted onto the pins and projecting through the internal plates, with rollers fitted onto the inserts between the internal plates, a lubricated interface being identified between each roller and respective insert and a sealing gasket being present in proximity to each end of the roller, characterized in that the roller is provided, at each end, with a bevel tilted towards the inside of the roller to identify a seat between the internal plate and the external surface of the respective insert, into said seat the sealing gasket being accommodated.

BRIEF DESCRIPTION OF THE DRAWINGS

In order to make the explanation of the innovative principles of the present invention and its advantages with respect to the prior art clearer, with the help of the attached drawings, a possible embodiment given as an example applying such principles shall be described hereafter. In the drawings.

DETAILED DESCRIPTION OF THE INVENTION

Figure 1:
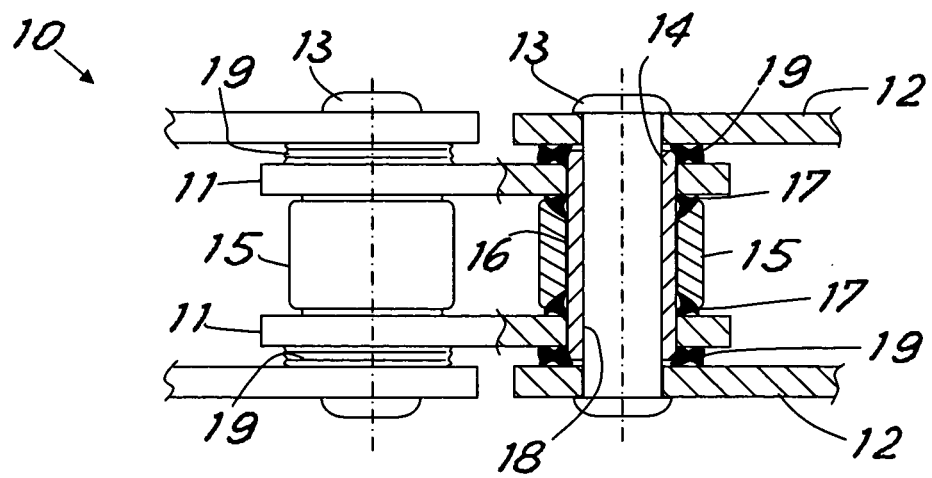
FIG. 1 represents a partial and partially sectioned view of a chain according to the invention.

With reference to the figures, in FIG. 1 a portion of chain is shown, generically indicated with 10, made according to the invention. The chain 10 has links which are formed by pairs of internal and external plates 11, 12 respectively connected together by pins 13 and by inserts 14, fitted onto the pins and projecting through the internal plates 11.

On the inserts 14, rollers 15 that are free to rotate, are mounted between the internal plates 11. The inserts and pins are forcedly mounted through the respective plates. Between each roller 15 and respective insert 14 a lubricated interface 16 is identified and at each end of the roller there is a ring seal gasket 17. The lubricated interface is thus stopped from emptying out.

Advantageously, between the insert 14 and the respective pin 13, a second lubricated interface 18 is identified. At each end of the insert which projects from the internal plate, a further ring seal gasket 19, which stops the interface 18 from emptying out, is mounted and compressed between the plates.

Figure 2:
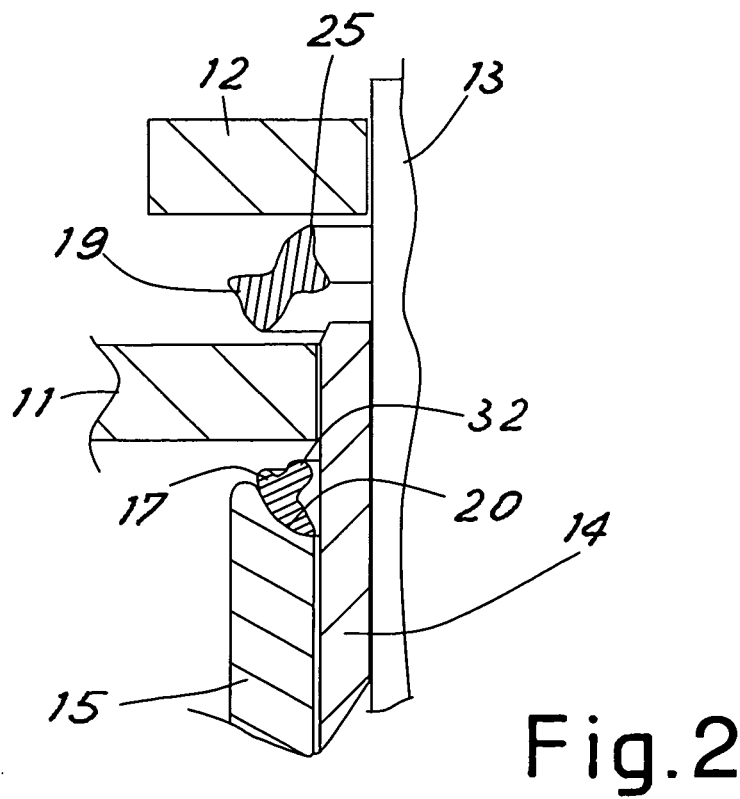
FIG. 2 represents an enlarged view of a partially disassembled detail of a first embodiment of the chain, according to the invention.
Figure 3:
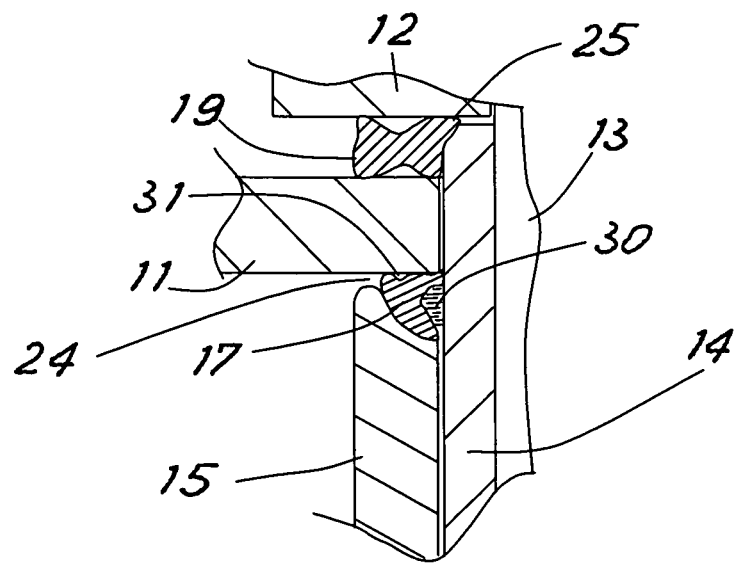
FIG. 3 represents an enlarged view of the detail of FIG. 2 in its assembled configuration.

As can be better seen in FIG. 2, at each end, the roller 15 has an end surface which is shaped with a bevel 20 towards the inside of the roller so as to form an undercut above the external surface of the insert and towards the respective internal plate. As can be seen in FIG. 3, in such a way, a seat 24 is obtained between the internal plate, the ends of the roller and the external surface of the respective insert. In the seat 24 the sealing gasket 17 is accommodated. The seat of the gasket is generally triangular-shaped.

As can be clearly seen in FIGS. 2 and 3, according to a first embodiment of the chain according to the invention, the bevel 20 is made with a concave curved surface and the gasket 17 has a section which matches such a surface. Advantageously, the gaskets 17 can be stably constrained to the surface of the bevel so as to facilitate its mounting and the keeping of its position thereafter. For such a purpose, the gasket is advantageously co-pressed onto the surface of the bevel. In such a way, a roller is made with integrated gaskets and the assembly step of the internal links of the chain can be carried out more easily by using the feeding methods of conventional rollers, without feeding the O-Rings separately. Moreover, the co-pressing process allows the gasket to be shaped practically as desired.

As can again be seen in FIG. 2, in the disassembled or partially assembled condition (in other words, not compressed by the internal plate), the internal diameter of the gasket 17 is advantageously greater than the outer diameter of the insert. In such a way, it is possible to introduce the lubrication, before the complete assembly of the chain.

As shown in FIG. 3, the gasket 17 advantageously has a section which forms a cavity 30 between it and the surface of the insert. Such a cavity receives a lubricant reserve. Again advantageously, the gasket can have a section forming a second cavity 31 between it and the surface of the internal plate. Such a second cavity also receives a lubricant reserve. In this way, one or two sacks of lubricant are created which can be used as reserve in the case in which the grease between roller and insert is lacking and they improve the lubrication between gasket, insert and internal plate. This ensures a greater durability of the lubricated interface and therefore, of the chain.

Advantageously, the gasket 17 has a section with a lip 32 projecting towards the edge between the internal plate and the insert. The non compressed gasket is slightly cone-shaped outwards from the axis of the pin. When the gasket is compressed between the roller and the plates it is advantageously given a rotation towards the insert and, in practice, the contact between the insert and gasket occurs not due to the compression, but rather to the torsion of the gasket. This improves the seal, simultaneously facilitates the assembly and reduces the friction caused by the gasket itself which not only can be compressed but it can also bend.

As can be seen again in FIG. 2, even the gasket 19 can have a shaped and not simply toroidal section. In particular, such a gasket, before being compressed between the plates, is generically cone-shaped and when it is locked between the plates, it undergoes a rotation which improves the seal, whereas, in the non compressed condition, it is more easily fitted onto the insert. When there is compression between the plates, apart from rotating, its lip 25 tends to wedge in between the insert and the external plate to recover the wear of the seal gasket 19 itself.

Advantageously, the chain can be mounted in two steps. In a first partially assembled condition (similar to that of FIG. 2) all the mechanical parts are reciprocally assembled, but the plates are not in their final position. In such a way the gaskets do not form a seal and the lubricant can be injected or can spontaneously enter between the roller and the insert and between the pin and the insert. After introducing the lubricant, a calibration step is carried out, in which the plates are brought together, so as to obtain the complete assembly and the sealing of the interfaces by the gaskets. With the embodiment of FIG. 2 the assembly is therefore easily automated.

Figure 4:
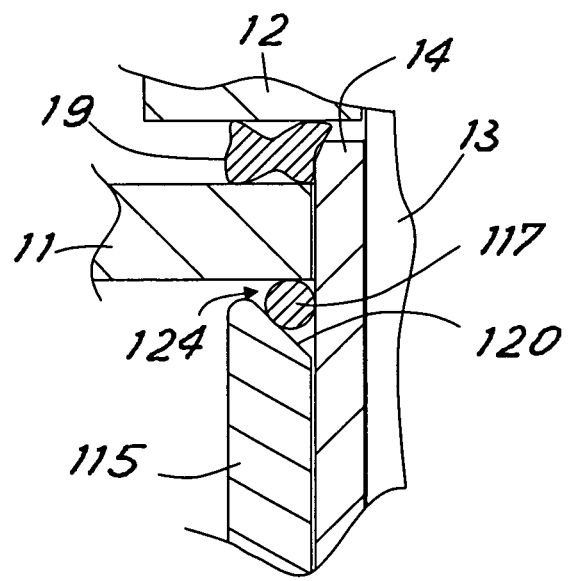
FIG. 4 represents an enlarged view of a detail of a second embodiment of the chain, according to the invention.

In FIG. 4 a variant embodiment of the chain according to the invention is shown. In such a second embodiment of the chain, the bevel 120 identifies a rectilinear frusto-conical surface and receives a normal circular sectioned O-Ring 117 which forms the gasket and holds the lubricant inside the lubricated interface between each roller 115 and the respective insert 14. A liquid reserve is held in the closed triangular area of the gasket.

Figure 5:
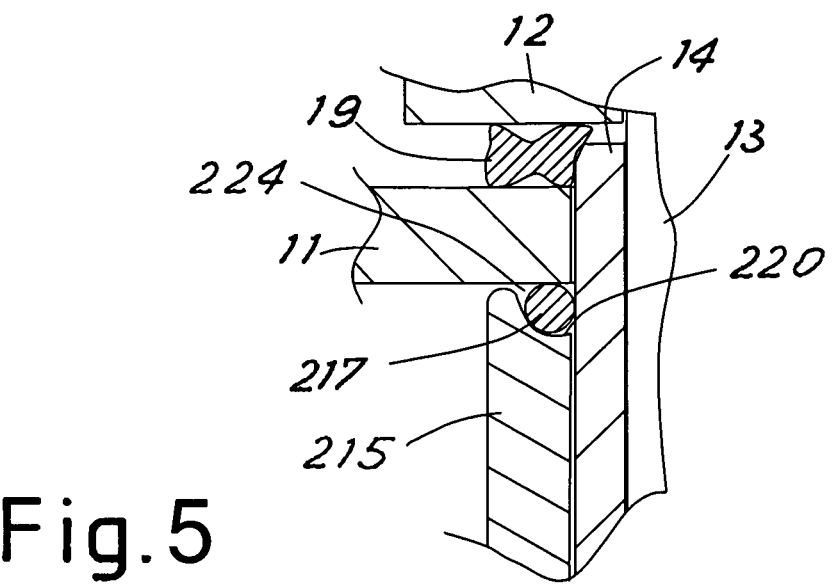
FIG. 5 represents an enlarged view of a detail of a third embodiment of the chain, according to the invention.

In FIG. 5 a third embodiment of the chain is shown. Also for such a third embodiment, the main parts that are modified with respect to the first embodiment are indicated with the same reference numerals as in the first embodiment but raised by two hundred. Equivalent elements to those of the previous embodiment have the same reference numerals.

In such a third embodiment, the roller indicated with 215, has an end surface with a tilted bevel 220, to define a circumferential cavity for accommodating a gasket 217 in the form of a circular sectioned O-Ring. The bevel has a concave curvature, so that the seat 224 of the gasket generically has a triangular-shape with a curved side. Advantageously, the curvature at least partially follows the curvature of the corresponding section of the gasket 217.

With a concave bevel, the space available to the toroidal O-Ring is greater, and therefore, the thickness of the chain can be reduced without altering the compression of the O-Ring with respect to the previous embodiment.

In the second and third embodiment, the feeding of the O-Ring is a separate step of the chain assembly. The internal links will be pre-assembled with the inserts not protruding (the plates mounted flush with the insert, widened), so as to allow the grease to be injected or to spontaneously enter between the roller and the insert and then to be sealed in the following calibration step.

Of course, before the complete assembly, also in the space between the pin 13 and the insert 14, the suitable lubricant is inserted.

Figure 6:
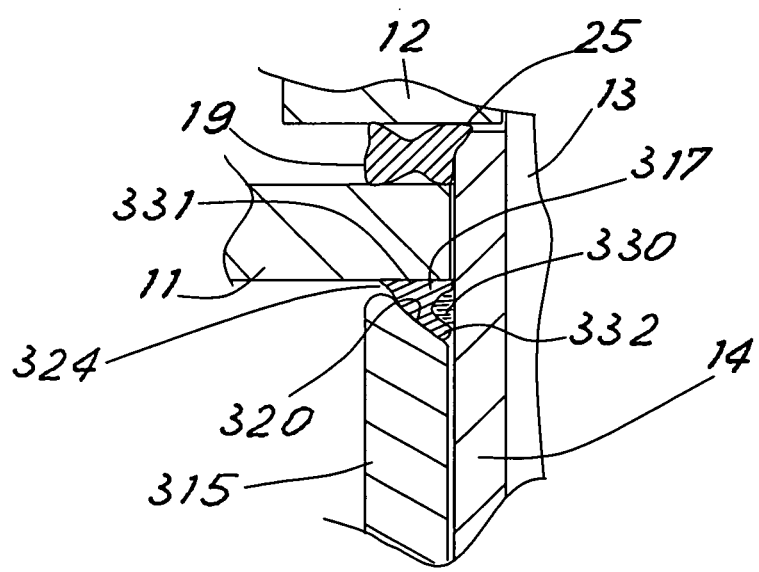
FIG. 6 represents an enlarged view of a detail of a fourth embodiment of the chain, according to the invention.

In FIG. 6 a fourth embodiment of the chain is shown. Also for such a fourth embodiment, the main parts that are modified with respect to the first embodiment are indicated with the same reference numerals as the first embodiment but raised by three hundred. Equivalent elements to the previous embodiments have the same reference numerals.

In such a fourth embodiment, the roller, indicated with 315 has an end surface with a tilted bevel 320, to define a circumferential cavity for accommodating a lip gasket 317. The bevel can substantially be rectilinear. The seat 324 of the gasket generically has a triangular shape and the gasket is co-pressed onto the plate 11 to be stably constrained to it and rests and slides against the surface of the bevel 320 with the lip 332. The lip is bent towards the insert and the gasket also identifies a lubricant reserve 330. With the gasket co-pressed on the plate 11 the assembly is facilitated. Possibly, the gasket 19 could also advantageously be co-pressed on the internal plate 11.

At this point it is clear how the set purposes have been achieved.

It has been found that with the particular conformation and arrangement of the seals according to the invention, the outflow of the lubricant is greatly delayed and the durability of the entire chain is therefore extended.

The length of the roller in contact with the gear wheel (not shown) for engaging the chain can be kept the same as that of conventional chains. In such a case, the contact area between the insert and the roller is slightly reduced due to the space occupied by the gasket. This fact is compensated however by the forced lubrication which is obtained by holding the lubricant between the roller and the insert.

The advantageous lip shape of the external gasket 19 and of the gasket 17 or 317 provides a higher flexibility of the gaskets themselves when they are compressed compared to known gaskets (for example, conventional circular sectioned O-Rings). This has been found to make the chain run more smoothly. An automatic recovery of the clearances produced due to wearing is also obtained.

As it is obvious to a man skilled in the art, the shape of the gaskets with the lip protruding outwards from the axis of the pins allows the chain to be assembled more easily also through automated machines.

Also the embodiments according to the invention having 0-ring gaskets have advantages compared to the prior art.

In all cases, the generically triangular shape of the seat of the gaskets of the rollers has proven to surprisingly provide an optimal seal and a lower wearing of the gaskets, especially thanks to the distribution of the lateral forces which push the roller axially.

The bevel shaped ends of the rollers can also be directly obtained by pressing, thus without worsening costs.

Of course, the description made above of an embodiment applying the innovative principles of the present finding is given as an example of such innovative principles and must not therefore be used to limit the scope of protection claimed hereby. For example, the chain can comprise known lubricant reserve and distribution means inside the pins. The exact shape of the seat and gaskets can vary with respect to that shown.

What is claimed is:

1. Chain comprising
   links formed by pairs of internal and external plates respectively connected by pins and inserts fitted onto the pins and projecting through the internal plates,
   rollers fitted onto the inserts between the internal plates,
   a lubricated interface being located between each roller and respective insert, and
   a sealing gasket being present in proximity of each end of the roller,
   the roller being provided, at each end, with a bevel tilted inwards the roller to identify a seat between the internal plate, the end of the roller and an external surface of the respective insert,
   the sealing gasket being accommodated in said seat, the sealing gasket having a section extending along a surface of the insert forming a cavity between the sealing gasket and the surface of the insert, with a lubricant reserve being held in the cavity.

2. Chain according to claim 1, wherein the bevel has a concave curved profile.

3. Chain according to claim 2, wherein the concave curved profile at least partially follows curvature of a corresponding section of the gasket.

4. Chain according to claim 1, wherein the gasket has a section with a lip projecting towards an edge between the internal plate and the insert.

5. Chain according to claim 4, wherein under a non-pressed condition the gasket has a greater internal diameter with respect to an external diameter of the insert and the lip is deformed by contact with the internal plate for sealing against the insert.

6. Chain according to claim 1, wherein the gasket has a lip lying on the bevel and the lip is bent towards the insert.

7. Chain according to claim 1, wherein a lubricated interface is located between the insert and a respective pin and mounted on each end of the insert is a further annular sealing gasket which is compressed between a respective internal plate and external plate.

8. Chain according to claim 7, wherein the further gasket is shaped with a lip projecting towards an edge between the insert and the external plate and is deformed by contact with the external plate wedging between the external plate and the insert.

9. Chain according to claim 8, wherein the further gasket is co-pressed on the internal plate.

* * * * *